United States Patent

[11] 3,628,422

| | | | | |
|---|---|---|---|---|
| [72] | Inventor | Sydney R. Acre<br>Elsie, Mich. | | |
| [21] | Appl. No. | 847,112 | | |
| [22] | Filed | Aug. 4, 1969 | | |
| [45] | Patented | Dec. 21, 1971 | | |
| [73] | Assignee | Midland-Ross Corporation<br>Cleveland, Ohio | | |

[54] POWER BRAKE REACTION MECHANISM
4 Claims, 4 Drawing Figs.

[52] U.S. Cl. ................................................. 91/369 B,
    91/376
[51] Int. Cl. ................................................... F15b 9/10
[50] Field of Search ..................................... 91/369 B,
    369 R, 369 A, 376

[56] References Cited
UNITED STATES PATENTS

| | | | |
|---|---|---|---|
| 3,037,486 | 6/1962 | Taylor | 91/369 B |
| 3,150,493 | 9/1964 | Rike | 91/369 B |
| 3,183,789 | 5/1965 | Stelzer | 91/369 B |
| 3,246,578 | 4/1966 | Randol | 91/369 B |
| 3,013,535 | 12/1961 | Schultz | 91/369 B |
| 3,082,745 | 3/1963 | Brooks | 91/369 B |
| 3,209,658 | 10/1965 | Randol | 91/369 B |
| 3,249,021 | 5/1966 | Wuellner | 91/369 B |

*Primary Examiner*—Paul E. Maslousky
*Attorney*—Malcolm R. McKinnon

ABSTRACT: A reaction mechanism for a two-stage power brake unit having a pressure-responsive movable wall, valve means controlling the pressure differential on opposite sides of the wall and actuating means operable in a first stage to effect movement of the valve means in response to manual effort, the reaction mechanism including freely floating lever means operable in a second stage to resist movement of the actuating means in a substantially direct and uniform ratio to the force developed by the wall.

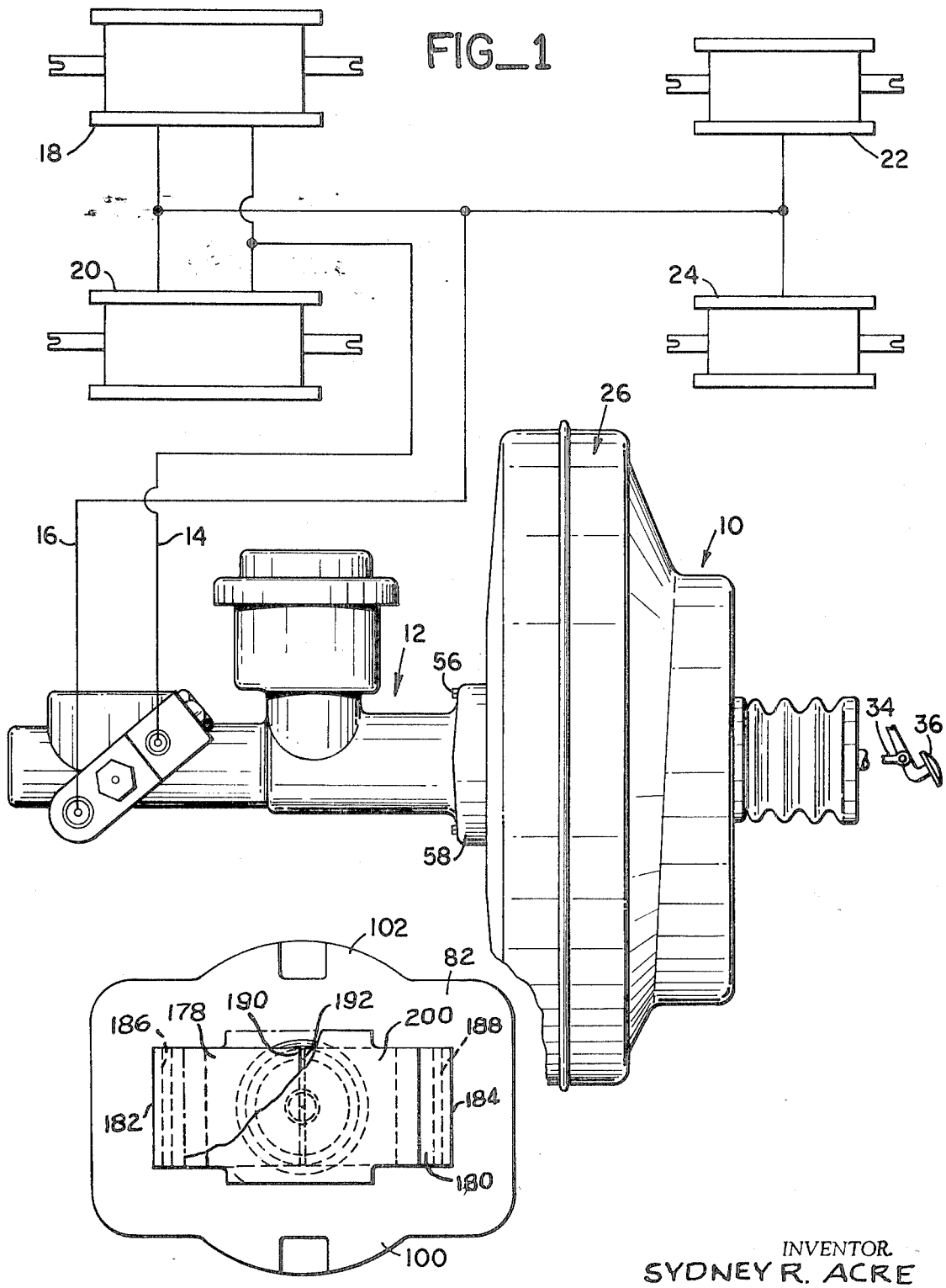

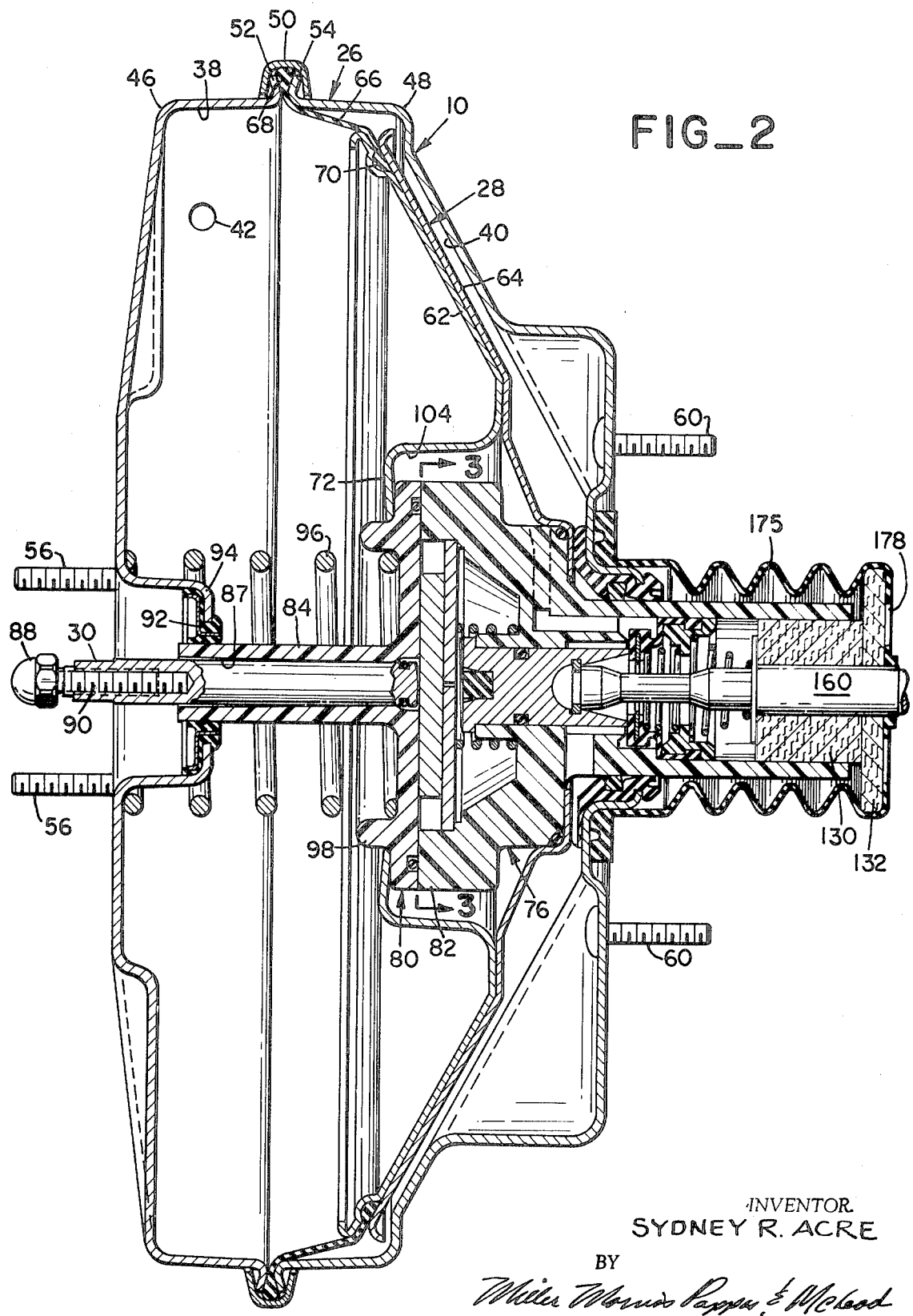

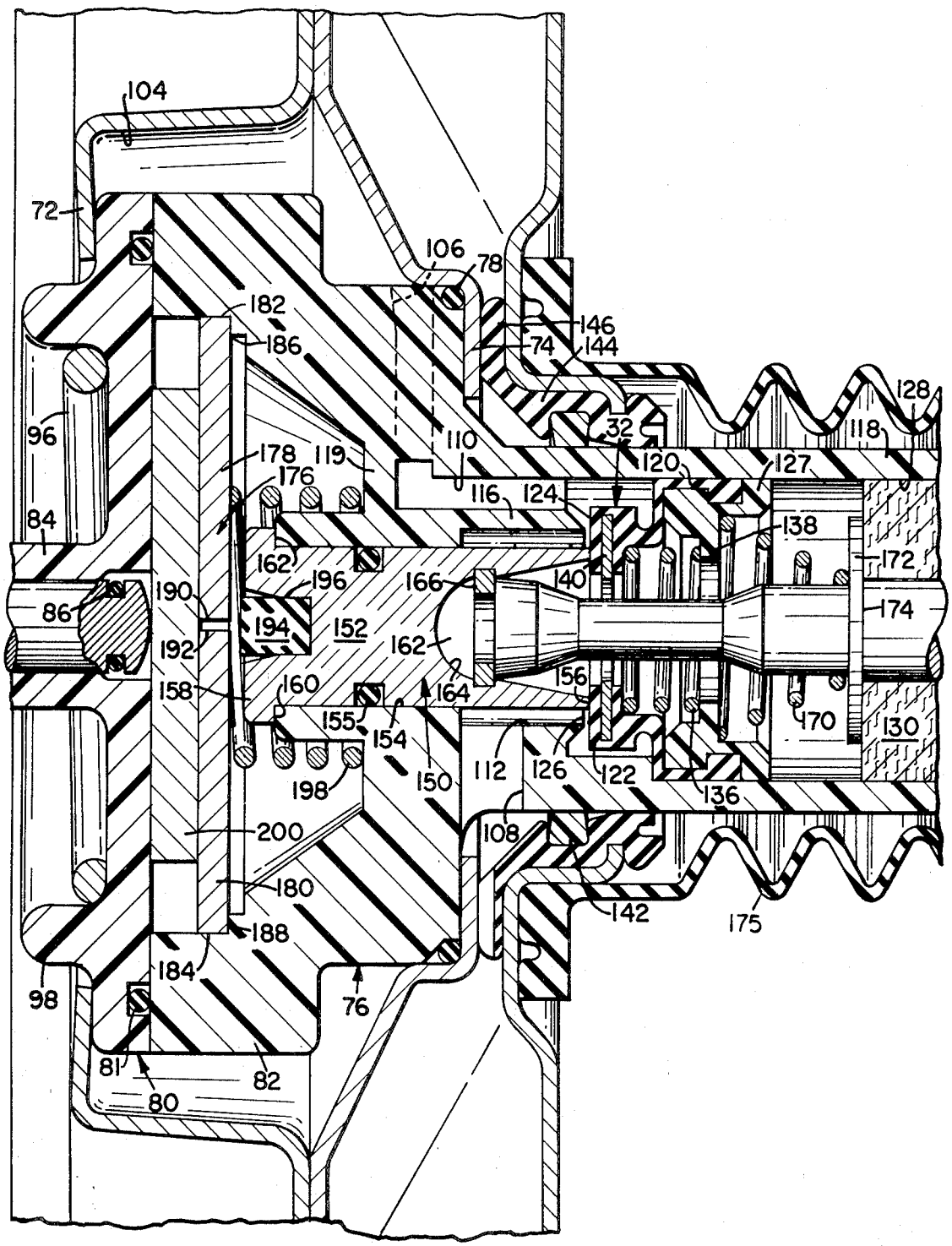
FIG_2A

POWER BRAKE REACTION MECHANISM

BRIEF SUMMARY OF THE INVENTION

This invention relates to power brake systems for automotive vehicles and, more particularly, to an improved reaction mechanism for power brake means adapted to actuate a master cylinder in a hydraulic brake system on an automotive vehicle.

In the past, conventional, nonpower brake systems on automotive vehicles were constructed in a manner such that the degree of braking at the vehicle wheels was a function of the force applied manually by the foot of the operator to the brake pedal so that the greater the pedal effort, the greater the braking effect. Drivers of automotive vehicles became accustomed to this characteristic and now expect it in all brake systems including power brake systems having power mechanisms that serve to reduce the manual effort required to achieve braking. Refinements in power brake systems have led to various means by which ratios are established between the forces that must be applied manually by the foot of the operator to produce braking and the forces that are produced by the power brake unit. That portion of the force that is applied manually usually is intended to be some fixed percentage of the force applied by the power unit and is generally referred to in the trade as pedal reaction or "feel."

In a power brake system pedal reaction or feel normally is afforded by utilizing a portion of the output pressure of the hydraulic system or of the force applied by the power brake unit and returning it to the foot of the operator. Prior feel-producing structures have involved pistons acted on by hydraulic pressure to move them in a direction opposite to the movement of the piston in the master cylinder, as well as complicatedly mounted and intricately constructed levers which are pivoted in response to movement of components such as the movable wall of the power unit, and prior structures have also involved separate pistons smaller than the power wall of the power unit, the smaller pistons being acted on by the same pressure differential causing power braking.

Prior power brake reaction mechanisms have many complexly interrelating parts which are difficult to resolve or analyze and have become increasingly intricate and expensive in the attempts to reflect accurately the ratio between that portion of the total braking effort produced by the power unit and that produced by manual effort. Moreover, because of increased reliability requirements and the very substantial difficulties arising when it is necessary to recall very substantial quantities of automobiles because of alleged deficiencies which may be encountered in a very small number of units, the reliability requirements now specified by automotive manufacturers for power brake reaction mechanisms have been materially increased in recent years.

In addition, the power brake units are subject to hysteresis effects which, in brief, are a phenomenon wherein any given force applied at the brake pedal results in one value of hydraulic pressure when the brakes are being applied and in still another pressure when the brakes are being released. Hysteresis, the difference between these two values, varies over the full range of braking and must be kept to a minimum to have an acceptable power brake system. Furthermore, hysteresis is an extremely undesirable and critical factor which often varies under different conditions of brake operation and cannot be accurately predicted. In recent years, the phenomenon of hysteresis has become even more critical because of the great reductions in initial braking pedal effort required to produce the maximum power braking now specified by automobile manufacturers, presumably as a result of demands by the driving public. By way of example, a number of years ago the pedal effort required to initiate operation of the brake unit was approximately 10 to 12 pounds of force on the brake pedal whereas today braking is expected to be initiated with only 3 to 4 pounds of manual effort applied to the brake pedal. Moreover, the maximum amount of power braking was accomplished in prior years with as much as 80 to 90 pounds of force on the brake pedal whereas today the same range of braking is expected with as little as 30 pounds of manual effort. This great reduction in range in initial pedal effort and maximum pedal effort makes it extremely difficult to provide power brake reaction mechanisms which are sufficiently sensitive to reflect accurately brake output in terms of feel at the pedal. The frictional forces resulting from the more complicated prior reaction mechanisms and the phenomenon of hysteresis becomes magnified in the narrow range of initial and maximum allowable pedal effort. In actual practice, conventional types of reaction mechanisms used in prior power brake systems not only are incapable of accurately reflecting the degree of braking in terms of feel but also in many instances render prior systems completely uncontrollable. In other words the frictional forces and hysteresis vary from one brake application to another so that what an operator feels does not accurately portray the degree of braking and, as a consequence, the operator cannot judge the amount of pedal force that will be necessary to produce different types of vehicle decelerations, varying from extremely fast stops to gradual stops.

The difficulty of accurately providing feel characteristics in a power brake system is compounded by the nature of the various linkages and hydraulic circuits in a hydraulic brake system. The amount of braking or deceleration of a vehicle is related to the pressure of the hydraulic fluid in the braking system, but to produce hydraulic pressure it is first necessary to displace the hydraulic fluid in the master cylinder. However, the nature of hydraulic braking systems is such that there is no direct relationship between hydraulic fluid pressure and displacement because initial displacement is normally utilized to take up lost motion and slack in mechanical linkages and pivots in the brake shoes at the wheels and to move the brake linings from their fully released or rest position to a position at which the brake lining is just touching the rotating surface to be braked. Only after this has occurred does subsequent displacement of hydraulic fluid result in effective hydraulic pressure and in braking in a substantial direct relation to hydraulic pressure.

An object of the present invention is to overcome the aforementioned as well as other disadvantages of prior power brake reaction mechanisms of the indicated character and to provide an improved power brake reaction mechanism which provides improved pedal reaction corresponding to braking effort applied at the wheels of the vehicle, and which is extremely reliable in operation.

Another object of the invention is to provide an improved power brake reaction mechanism in which movement of the manual actuator of the power brake unit to its selected actuating position is resisted by a force corresponding to the force which drivers are accustomed to experience with conventional nonpower hydraulic brake systems.

Another object of the invention is to provide an improved power brake reaction mechanism which may be readily varied to make the force required of the operator correspond to the characteristics of the vehicle brake system.

Another object of the invention is to provide an improved, power brake reaction mechanism incorporating improved and greatly simplified means for controlling braking action.

Still another object of the invention is to provide an improved power brake reaction mechanism that is economical and commercially feasible to manufacture, assemble, and test with mass production labor and methods, durable and efficient in operation.

The above as well as other objects and advantages of the present invention will become apparent from he following description, the appended claims and the accompanying drawings disclosing a preferred embodiment of the invention.

BRIEF DESCRIPTION OF THE DRAWINGS

FIG. 1 is a longitudinal view of a power brake unit embodying the present invention, showing the same in association with schematically illustrated components of a hydraulic brake system;

FIG. 2 is an enlarged, longitudinal, sectional view of a power brake reaction mechanism embodying the present invention, showing the same installed in the power brake unit illustrated in FIG. 1;

FIG. 2A is an enlarged, longitudinal sectional view of a portion of the structure illustrated in FIG. 2; and FIG. 3 is a transverse sectional view of a portion of the structure illustrated in FIG. 2, taken on the line 3—3 thereof, and showing the same rotated 90°.

Referring to the drawings, a power brake unit, generally designated 10, is illustrated embodying the present invention, the power brake unit 10 having particular utility in hydraulic brake systems of the type illustrated diagrammatically in FIG. 1. In such systems, which are conventionally known as dual brake systems, hydraulic fluid is delivered from a dual master cylinder 12 through lines 14 and 16 to brake actuators or wheel cylinders 18, 20, 22 and 24 which function to move the brake shoes into engagement with the brake drums and apply the brake at the wheels (not shown). These components are of conventional construction and operation and their use is so well known in the art that a detailed description is not required for a full understanding of the invention.

When the dual master cylinder 12 of such brake systems is actuated by a power brake unit rather than by manual force alone, the brake system is referred to as a power brake system. The power brake unit 10 embodying the present invention includes a housing 26 in which a movable wall unit 28 responds to pressure differentials to move an output member 30 which actuates the master cylinder 12 that may be conveniently mounted on the housing 26 as shown in FIG. 1. The pressure differential acting on the wall unit 28 is under the control of valve means, generally designated 32, actuated by manual means through a link 34 that is connected to a conventional brake pedal 36. In the embodiment of the invention illustrated, the power brake unit 10 is of the vacuum suspended type; that is, in its brake released position as shown in FIG. 2, vacuum exists in the chambers 38 and 40 formed in the housing 26 on opposite sides of the wall unit 28 and the latter remains stationary. In order to actuate the unit, atmospheric air is admitted to the rear chamber 40 and since vacuum exists in the forward chamber 38, the resulting pressure differential on the wall unit 28 moves it and the output member 30 to displace hydraulic fluid from the dual master cylinder 12 through the lines 14 and 16 to the brake actuators 18, 20, 22 and 24. The source of vacuum is provided by placing the intake manifold of an internal combustion engine (not shown) in communication with a passageway 42 formed in the wall of the housing, a suitable check valve (not shown) being interposed between the line leading from the intake manifold to the power brake unit so as to prevent loss of vacuum in the housing 26 when the intake manifold pressure becomes higher than the pressure in the forward chamber 38 of the power unit under various operating conditions of the vehicle engine.

The housing is comprised of a front housing member 46 and a rear housing member 48 which may be joined together in any conventional manner. In the embodiment of the invention illustrated the front housing member 46 and the rear housing member 48 are joined together in fluidtight relationship by a clamp band 50 which engages flanges 52 and 54 formed on the periphery of the front and rear housing members 46 and 48, respectively.

The front housing member 46 is provided with fastening means 56 by which a flange 58 on the dual master cylinder 12 may be mechanically connected directly to the housing 46. The rear housing member 48 is provided with studs 60 by which the entire assembly may be mounted within the engine compartment of a vehicle in a position for connection to the brake pedal 36.

The movable wall 28 includes a pair of generally disc-shaped plates 62 and 64 and an annular diaphragm 66. The beaded outer edge 68 of the diaphragm 66 is clamped between the flanges 52 and 54 provided on the front and rear housing members, respectively, and the beaded inner edge 70 of the diaphragm 66 is clamped between the plates 62 and 64 which may be permanently fastened together as by spot welding. The inner portions of the plates 62 and 64 are provided with diverging flange portions 72 and 74, and a control hub, generally designated 76 is provided which is mounted between and carried by the flange portions 72 and 74, a sealing ring 78 being provided around the periphery of the control hub to prevent leakage between the chambers 38 and 40 defined by the housing 10.

As shown in FIGS. 2 and 2A, a guide member 80 is provided which is mounted on the enlarged forward portion 82 of the control hub 76, a gasket 81 being provided so that the guide member and control hub are sealed together in fluidtight relationship. The guide member 80 is provided with a centrally disposed tubular guide portion 84 in which is mounted the output push rod 30, the rod 30 being retained by an O-ring 86 which does not engage the adjacent wall of the guide member 80 in sealing relationship so that atmospheric air is permitted to flow through the bore 87 of the guide portion 84 around the periphery of the rod 30. The output push rod 30 is also provided with an adjustable head 88 having a prevailing torque lock bolt portion 90 which threadably engages the push rod 30 whereby the effective length of the push rod may be adjusted as desired for cooperation with the dual master cylinder 12.

As viewed in FIG. 2, the periphery of the left or forward end section of the tubular guide portion 84 is supported for sliding movement in a combined seal and bearing assembly 92 carried in an internally recessed boss portion 94 of the front housing 46. The boss portion 94 also functions as a guide for one end portion of a return coil spring 96 one end of which bears against the end wall of the front housing 46 while the opposite end of the return spring 96 bears against the guide member 80 and is retained by an integral circular rib 98 provided on the guide member 80.

As shown in FIG. 3, the guide member 80 and the enlarged forward portion 82 of the control hub 76 are generally rectangular in transverse cross section, such members being provided with curvilinear segments 100 and 102 projecting outwardly therefrom and having substantially the same diameter as and functioning as a support for the rib 98. The flange 72 of the plate 62 does not engage the entire circumference of the guide member 80 and consequently open communication is effected between the chamber 38 and the chamber 104 defined by the diverging flange portions 72 and 74 of the diaphragm plates 62 and 64, respectively, and the peripheral surfaces of the guide member 80 and the control hub 76. The only communication between the chambers 38 and 40 at opposite sides of the movable wall 28 is through a plurality of radially extending passageways or ports 106 and 108 and a plurality of longitudinally extending passageways 110 and 112 defined by the body portion of the control hub 76, communication between the chambers 38 and 40 through the passageways 106, 108, 110 and 112 being controlled by the valve assembly generally designated 32.

The body of the control hub 76 includes an integral tubular portion 116 which is disposed in spaced, substantially concentric relationship with respect to the annular wall 118 of the body portion and which is joined thereto by integral ribs 119 so that the tubular portion 116 and the annular wall 118 define the plurality of angularly disposed, axially extending passageways 110 disposed between the tubular portion 116 and the annular wall 118. The tubular portion 116 is also recessed to define the internal passageway 112 at the right end portion thereof as viewed in FIG. 2. The radially outer ends of the passageways 106 communicate with the front chamber 38 through the chamber 104 while the radially inner ends of the passageways 106 communicate with the passageways 110. The radially outer ends of the passageways 108 defined by the body of the control hub 76 communicate with the rear chamber 40 while the radially inner ends of the passageways 108 communicate with the passageways 112 defined by the tubular portion 116.

The valve means 32 for controlling the power brake includes an annular valve element 120 formed of resilient material and having an annular flange portion 122 on the inner end thereof providing a radially disposed sealing surface 124 adapted to engage the end 126 of the tubular portion 116, the end 126, functioning as one seat for the valve element 120. The right end portion of the annular valve element 120, as viewed in FIG. 2, engages the wall 118 of the control hub in sealing relationship, the valve element 120 being retained by a combined valve and spring retainer 127 having a press fit in the bore 128 defined by the wall 118. The bore 128 is open to atmospheric pressure through filters 130 and 132.

The flange portion 122 of the valve element 120 is biased toward the seat 126 of the tubular portion 116 by a spring 136 one end of which bears against the flange portion 122 while the opposite end of the spring 136 bears against an internally projecting rib 138 provided on the valve and spring retainer 127. The flange portion 122 of the valve element 120 is preferably reinforced by a washer 140 to insure that the flange portion 122 is maintained in a substantially flat condition.

As shown in FIG. 2A, the periphery of the wall 118 of the control hub 76 is supported for sliding movement in a guide ring 142 carried by a sealing member 144, the sealing member 144 engaging the periphery of the wall 118 in fluidtight relationship and being fixed to the rear wall of the cover 48. The sealing member 144 is also provided with a radially outwardly extending flange portion 146 which functions as a bumper for the flange portion 74 of the movable wall 28 when the power unit is in the released position.

A plunger 150 is provided the body portion 152 which is mounted for sliding movement in the bore 154 of the tubular portion 116, an O-ring 155 being provided to seal the bore 154 against passage of atmospheric air therethrough. The plunger 150 controls the position of the valve element 120 so that when the plunger 150 is actuated, communication between the chambers 38 and 40 will be closed off and atmospheric pressure subsequently permitted to enter the rear chamber 40. The end 156 of the plunger 150 also functions as a seat for the valve element 120 preventing entrance of atmospheric air into the rear chamber 40 when the plunger 150 occupies the position illustrated in FIG. 2A. The plunger 150 is provided with an enlarged head portion 158 providing a shoulder 160 adapted to bear against the end 162 of the tubular portion 116. Since the distance between the shoulder 160 and the end 156 of the plunger can be accurately controlled and since the length of the tubular portion 116 can also be accurately controlled during manufacture, the distance between the seats 126 and 156 can be controlled to very close tolerances thereby insuring that all units will meet performance specifications when produced by mass production techniques.

When the plunger 150 is moved to the left, as viewed in FIG. 2A, the sealing surface 124 of the valve element 120 engages the seat 126 of the tubular portion 116 thereby sealing communication between the front and rear chambers 38 and 40. As the plunger moves to the left an additional increment the end 156 of the plunger disengages from the valve element thereby permitting atmospheric air to flow through the bore of the valve element to enter the rear chamber 40.

An input push rod 160 is provided which is mounted for axial movement within the body of the control hub 76, one end of the push rod being provided with a hemispherically-shaped head portion 162 adapted to engage a complementary recess 164 defined by the plunger 150 and being retained by a snapring 166. The rear end of the push rod 160 is adapted to be pivotally connected to the brake pedal 36 as schematically illustrated in FIG. 2.

The input push rod 160 is biased toward the right, as viewed in FIG. 2, by a low-rate, preloaded conical spring 170, one end of which bears against the rib 138 of the retainer 127 while the opposite end of the spring 170 bears against a generally star-shaped washer 172 seating against a shoulder 174 provided on the push rod 160. The push rod 160 projects through a conventional boot 175 that serves to protect the protruding components of the power unit from dust, dirt and other foreign matter, the boot 175 being fixed to the rear housing, as at 176, and being provided with openings 178 permitting atmospheric air to pass through the filters 132 and 130 into the bore of the valve 120.

In accordance with the present invention, a reaction mechanism, generally designated 176 is provided which is operable to resist movement of the input push rod 160 and the brake pedal 36 in a substantially direct and uniform ratio to the force developed by the wall 28. At the same time, movement of the wall 28, in response to differential pressure and movement of the plunger 150, is transmitted to the output push rod 160 through the reaction mechanism 176. The reaction mechanism 176 is comprised of a pair of flat, freely floating levers 178 and 180 which are identical to each other. Each of the levers 178 and 180 is substantially rectangular as viewed in plan, side and elevation, as shown in FIGS. 2, 2A and 3, and all opposed surfaces of each of the levers 178 and 180 are symmetrical, parallel, and identical to each other. The levers 178 and 180 are disposed radially in spaced relationship and have their outer ends 182 and 184 supported for pivotal movement on shoulders 186 and 188 provided on opposite sides of the enlarged head portion 82 of the control hub 76. The spaced inner ends 190 and 192 of the levers 178 and 180, respectively, are adapted to engage the adjacent end of the plunger 150 and a resilient plug 194, which may be formed of rubber or other suitable material, disposed in a recess 196 defined by the left end portion of the plunger 150, as viewed in FIG. 2A, the plug 194 serving to reduce noise as the levers 178 and 180 come into contact with the plunger 150. In the position illustrated in FIGS. 2 and 2A, the lever ends 190 and 192 are disposed in spaced relationship with respect to the plunger 150 and biased toward the left by a preloaded, low-rate spring 198 one end of which bears against the levers 178 and 180 while the opposite end of the spring 198 bears against the ribs 119 of the control hub. An intermediate portion of each of the levers 178 and 180 engages a substantially flat bridge member 200 which is loaded as a beam and the central portion of which engages the adjacent end of the output push rod 30. The bridge member 200 is substantially rectangular as viewed in plan, side and elevation and all opposed surfaces are symmetrical, parallel and identical to each other.

An important feature of the above-described construction of the levers 178 and 180 and the bridge member 200 embodying the present invention resides in the fact that such members cannot be installed in an improper manner. For example, the levers 178 and 180 and the bridge member 200 can be installed upside down or reversed end for end without detrimentally affecting the operation thereof. Moreover, the levers 178 and 180 are free to articulate and the levers 178 and 180 and the bridge member 200 are not detrimentally affected by shifting within the confinements of the head portion 82 of the control hub 76. In addition, with the above-described construction, the bridge member 200 has a single controlling dimension for its effectiveness—its length—which establishes the boost ratio and such dimension can be easily controlled and tested with mass production labor and methods of manufacture and testing. If the levers 178 and 180 or the bridge member 200 shift so that there is an increased lever ratio on one end, there is a decreased lever ratio on the opposite end with the net result that the boost ratio of the overall reaction mechanism is not changed. Also, the thickness of the levers controls the two-stage operation of the mechanism and the thickness of the levers can be accurately controlled with mass production labor and methods of manufacture and testing. Thus there are no changes in geometry and no changes in moment arms between various mass produced units. It will also be noted that the levers 178 and 180 and the bridge member 200 are encapsulated and located in the control hub 76 whereby a minimum of part dimensions control the operation of the mechanism. Moreover, since the spring 198 has a low rate and is preloaded, the two stage operation of the unit can be very accurately controlled in all units embodying the present invention.

In a released condition of the brakes, the power unit components are disposed in the position shown in FIGS. 2 and 2A, that is, the wall 28 is in its rearward position with the flange 74 on the plate 64 engaged with the flange 146 on the resilient sealing element 144 so as to limit rearward movement of the wall. In addition, the sealing surface 124 of the valve element 120 is engaged with the seat 156 on the end of the plunger 150 and disengaged from the seat 126 of the tubular portion 116. This permits communication between the front and rear chambers 38 and 40 through the chamber 104, and the passageways 106, 110, 112 and 108 but isolates the chambers 38 and 40 from the atmospheric pressure in the bore 128. Consequently, equal vacuum is present in both the chambers 38 and 40 and the wall 28 remains stationary. At the same time, the lever ends 190 and 192 are spaced from the rubber plug 194 a distance slightly greater than the spacing between the valve seat 126 and the surface 124 on the valve element 120.

Initial movement of the plunger 150 to the left in response to manual effort applied to the brake pedal 36 causes the plunger 150 to approach the levers 178 and 180 and causes the sealing surface 124 of the valve element 120 to engage the valve seat 126 on the tubular portion 116 of the control hub so as to isolate the front and rear chambers 38 and 40 from each other. The valve seat 156 remains engaged with the sealing surface 124 on the valve element 120 and the chambers 38 and 40 are thus also isolated from the source of atmospheric pressure. Under these conditions the valve means are disposed in a lap position; that is, an intermediate position in which any additional movement of the plunger 150 will result either in actuation of the wall 28 or in returning the valve element 120 to its normal nonactive position. During such initial movement the left end of the plunger 150 remains in spaced relationship with respect to the inner ends of the levers 178 and 180.

Upon an additional forward movement of the plunger 150, the valve seat 156 moves away from the sealing surface 124 on the valve element 120 so that the atmospheric air is permitted to enter the rear chamber 40 through the passageways 112 and 108 while the sealing surface 124 on the valve element 120 remains seated against the seat 126 on the tubular portion 116 of the control hub. Under such a condition free flow of air at atmospheric pressure is permitted through the passageways 112 and 108 into the rear chamber 40. Since subatmospheric pressure is maintained in the front chamber 38, the resulting differences in pressure on opposite sides of the wall 28 causes the wall 28 to move to the left, as viewed in FIG. 2, to initiate actuation of the master cylinder so that fluid is displaced in the hydraulic lines 14 and 16 so as to take up lost motion and move the brake linings to a position just touching the rotating surface to be braked. At this point, the only reaction provided at the brake pedal 36 is that provided by the spring 170 which preferably has a low rate. Since atmospheric pressure is present at both ends of the plunger 150, the plunger 150 is substantially balanced from a pressure standpoint with the result that movement of the plunger does not contribute substantially to reaction at the pedal 36, the only resistance to movement of the plunger being that of the O-ring 155 sealing the periphery thereof in the bore 154. As the pressure builds up in the master cylinder, the output push rod 30 and the master cylinder 12 resist movement of the wall 28 and as a consequence the levers 178 and 180 pivot about the free edge of the shoulders 186 and 188 against the biasing action of the preloaded, low-rate spring 198, and the ends 190 and 192 of the levers engage the rubber plug 194 and the end of the plunger 150. In doing so, the resilient rubber plug reduces the noise as the levers 178 and 180 engage the end of the plunger 150 without any detectable change in the effective lengths of the levers, the levers 178 and 180 maintaining line contact with the bridge member 200 as the levers move. This results in a force being applied through the plates 62 and 64 of the wall 28, the control hub 76, the levers 178 and 180 and the bridge member 200 to the output push rod 30 as that actuation of the master cylinder is effected to increase the fluid pressure therein. As the pressure in the rear chamber 40 increases and the wall 28 continues to move the output pressure from the master cylinder increases and upon engagement of the levers 178 and 180 with the plunger 150, the manual force applied to the plunger 150 is added to the force produced by the moving wall 28. These forces are applied through the levers and bridge member 200 as previously described to the output push rod 30 to increase the hydraulic output from the master cylinder.

Thus, the initial movement of the pedal and the plunger 150 is utilized to actuate the valve means 32 and the initial force applied to the master cylinder results from wall movement which also acts to pivot the levers 178 and 180 against the rubber plug 194 and the end of the plunger 150. Thereafter the force applied to the master cylinder is the sum of the forces due to pressure differential acting on the wall 28 and the manual effect on the pedal 36.

To increase the output of the master cylinder, that is, the force with which the brakes are being applied, additional manual force must be applied to the pedal 36. Such additional manual force continues the movement of the plunger 150 and while the wall 28 is also moving in the same direction, the valve means 32 remain open to admit atmospheric air to the rear chamber 40. As the hydraulic output increases the hydraulic pressure in the master cylinder reacts against the output push rod 30 from which the reaction is transmitted through the bridge 200 and the levers 178 and 180 and the plunger 150 to the brake pedal 36. In this manner, the operator may accurately sense the degree to which the brakes have been applied; that is, the greater the hydraulic output and brake application, the greater manual force required on the brake pedal.

After the brakes have been applied to the desired degree, the pedal movement is stopped and foot pressure is maintained. As movement of the plunger stops, the wall 28 continues to move a slight additional amount. Such relative movement causes the seat 156 on the plunger 150 to engage the surface 124 on the valve 120 so that communication from the atmospheric air supply through the passageways 112 and 108 to the rear chamber 40 is interrupted. The front and rear chambers 38 and 40 remain isolated from each other and the difference in pressure acting on opposite sides of the wall is maintained to apply a constant force on the master cylinder and keep the brakes applied to the selected degree.

In order to release the brakes, the foot pressure applied to the brake pedal 36 is reduced. The spring 170 then moves the plunger to the right to force the surface 124 on the valve 120 to disengage from the seat 126 on he tubular portion 116 so that the front and rear chambers 38 and 40 communicate with each other through the passageways 106, 110, 112 and 108 to reduce the pressure in the rear chamber 40. This decreases the differential pressure acting on the wall 28 and the reaction of the hydraulic pressure coupled with the force of the return coil spring 96 returns the wall 28 toward the right. When the wall reaches a position close to the rear housing 48 the reaction elements return to their normal position and the levers 178 and 180 pivot to a flat position adjacent the bridge 200 assisted by the spring 198.

An important aspect of the invention is the operation and characteristics in the initial stages of brake application. It will be noted that initial pedal effort is used only for opening the valve means 32 which results in power output until the levers 178 and 180 engage the rubber plug 194 and the end of the plunger 150 after which subsequent output in the second stage is the sum of the forces applied to the levers, one of these forces being due to manual effort and another to differential fluid pressure acting on the wall 28.

In the event of failure of the vacuum source, actuation of the brakes may be accomplished with manual effort alone. In this event the wall 28 remains stationary due to lack of differential pressure and movement of the pedal 36 results in movement of the plunger 150 against the levers 178 and 180, the levers in turn bearing against the bridge 200 which bears against the output push rod 30 so that manual force from the pedal is transmitted directly to the output push rod 30 which in turn actuates the dual master cylinder 12.

While a preferred embodiment of the invention has been shown and described it will be understood that various changes and modifications may be made without departing from the spirit of the invention.

What is claimed is:

1. A reaction mechanism for use in a power brake unit including an actuating member and an output member, said reaction mechanism including, in combination, a housing having internal walls defining a cavity, the opposite ends of said cavity including rectangular portions, a pair of rectangular levers each having substantially the same width as the rectangular portions of the cavity defined by said housing, each lever fitting in and being supported by said internal walls defining the rectangular portions of said cavity, the adjacent ends of said levers limiting movement of said levers relative to each other and to said housing, said levers being engageable with said actuating member, a bridge member disposed adjacent said levers and engaging said output member, said bridge member being adapted to engage each of said levers intermediate the ends thereof, and resilient means biasing said levers in a direction away from said actuating member and toward said bridge member.

2. The combination as set forth in claim 1, wherein the opposing surfaces on each of said levers are symmetrical, parallel and identical to each other.

3. In a power brake unit having a housing and a pressure-responsive movable wall forming therewith chambers on opposite sides of said wall, control means controlling the pressure differential on opposite sides of said wall, said control means including a hub member movable with said wall, a manually movable actuating member supported by said hub member, and an output member movable in response to movement of said wall, said hub member having internal walls defining a cavity, the opposite ends of said cavity including rectangular portions, a pair of rectangular levers each having substantially the same width as the rectangular portions of the cavity defined by said hub member, each lever fitting in and being supported by said walls defining the rectangular portions of said cavity, the adjacent ends of said levers limiting movement of said levers relative to each other and to said hub member, said levers resisting movement of said actuating member in a substantially direct ratio to the force developed by said wall, and a bridge member interposed between said output member and said lever members, said bridge member being adapted to engage each of said levers intermediate the ends thereof, and resilient means biasing said levers in a direction away from said actuating member and toward said bridge member.

4. The combination as set forth in claim 3 wherein the opposing surfaces on each of said levers and on said bridge member are symmetrical, parallel and identical to each other.

* * * * *